United States Patent
Kawahara et al.

[11] Patent Number: 5,890,983
[45] Date of Patent: Apr. 6, 1999

[54] COOLING APPARATUS OF A GEAR TRANSMISSION HAVING AN ELECTROMAGNETIC CLUTCH

[75] Inventors: Eiichiro Kawahara; Tetsuo Naraki, both of Wako, Japan

[73] Assignee: Honda Giken Kogyo Kabushiki Kaisha, Tokyo, Japan

[21] Appl. No.: 789,724

[22] Filed: Jan. 27, 1997

[30] Foreign Application Priority Data

Feb. 5, 1996 [JP] Japan .................................. 8-040299

[51] Int. Cl.$^6$ ...................................................... F16D 65/78
[52] U.S. Cl. .......................... 475/149; 475/154; 192/21.5; 192/113.31; 74/606 A; 188/264 R; 188/264 D
[58] Field of Search .................................. 475/149, 153, 475/151, 152, 154; 74/606 A; 192/21.5, 113.31, 113.3; 188/264 P, 264 F, 71.6

[56] References Cited

U.S. PATENT DOCUMENTS

| | | | |
|---|---|---|---|
| 2,325,647 | 8/1943 | Adamson | 74/606 A |
| 2,791,308 | 5/1957 | Barett et al. | 192/133.3 |
| 3,007,352 | 11/1961 | Biedess | 475/161 |
| 3,063,532 | 11/1962 | Jaeschke | 192/113.31 |
| 3,262,534 | 7/1966 | Monroe et al. | 192/21.5 |
| 3,469,665 | 9/1969 | Murata et al. | 192/21.5 |
| 3,572,477 | 3/1971 | Ewart | 192/113.31 X |
| 3,915,262 | 10/1975 | Klaue | 192/113.31 X |
| 3,962,595 | 6/1976 | Eddens | 310/93 |
| 4,445,599 | 5/1984 | Bopp | 188/264 X |
| 4,871,049 | 10/1989 | Okita | 192/113.31 X |
| 5,330,393 | 7/1994 | Deppert et al. | 475/154 |

FOREIGN PATENT DOCUMENTS

| | | |
|---|---|---|
| 0 549 804 A2 | 12/1991 | European Pat. Off. . |
| 0 642 207 A1 | 3/1995 | European Pat. Off. . |
| 2 445 058 | 12/1978 | France . |
| 2 502 720 | 3/1981 | France . |
| 2 580 126 | 10/1986 | France . |
| 1932880 | 1/1971 | Germany . |
| 63-64938 | 4/1988 | Japan . |

*Primary Examiner*—Rodney H. Bonck
*Assistant Examiner*—Ankur Parekh
*Attorney, Agent, or Firm*—Nikaido Marmelstein Murray & Oram, LLP

[57] ABSTRACT

A cooling structure of a power transmission apparatus is provided. The power transmission apparatus has an electromagnetic clutch including a fixed outer member with an exciting coil and a rotary inner member adapted to be fixed to the outer member by controlling electric energy provided to the exciting coil, and a gear device connected to the inner member of the electromagnetic clutch. A cooling apparatus is positioned between the outer member and a gear case member housing the gear device, for cooling both of the electromagnetic clutch and the gear device concurrently.

7 Claims, 6 Drawing Sheets

COOLING APPARATUS OF A GEAR TRANSMISSION HAVING AN ELECTROMAGNETIC CLUTCH

BACKGROUND OF THE INVENTION

The present invention relates to a power transmission apparatus used for a clutch or a brake, and particularly to a cooling structure thereof.

In an magnetic particle type electromagnetic clutch having an outer member forming an annular space, an inner member arranged inside of the outer member and electromagnetic powder of magnetic particles interposed between the outer and inner members, when an exciting coil supported by the outer member is charged with electricity to produce a magnetic field, magnetic particles in the electromagnetic powder are magnetized and a linkage of the magnetic particles is formed for connecting the outer and inner members. When the exciting coil is not charged with electricity, the outer and inner members are disconnected so as to freely rotate mutually.

In such a magnetic particle type electromagnetic clutch, a large amount of heat is generated by the exciting coil and slipping of the clutch on connecting and disconnecting to deteriorate stable connection-disconnection function and durability, therefore a forced cooling is necessary in general.

Accordingly, in a magnetic particle type electromagnetic clutch disclosed in Japanese Laid-Open Utility Model Publication No. Sho 63-64938 (1988), within an inner member is formed a cooling water passage from a core portion to an outer peripheral portion opposed to an outer member and at the outer peripheral portion is provided a special annular chamber to improve cooling effect.

There is also another example wherein a cooling water passage is formed in an outer member to cool mainly an exciting coil side.

In these examples, the cooling water passage is formed within an inner member or an outer member, so that it is advantageous spatially and the electromagnetic clutch itself does not become large.

However, since the cooling water passage is formed in the inner or outer member, construction of the member becomes complicated and the working is very troublesome. In case of a clutch which is connected and disconnected while both inner and outer members rotate, formation of the cooling water passage at a boundary between a fixed part and a rotating part is difficult. When the cooling water passage is formed in the inner member, cooling effect against heat generation of the exciting coil is small.

Further, the inner and outer members must be worked with high accuracy or sealed surely so that the cooling water passage is blocked surely from the electromagnetic powder and the exciting coil, which are apt to be influenced by liquid, and no leak of the cooling water occurs. This is difficult technically and results in a high cost, sometimes.

When the cooling water passage is formed within the inner or outer member, it is difficult to form fins within a limited interior space resulting in a small heat transmitting area, therefore a large quantity of water must be flowed in order to obtain a high cooling effect. If the cooling water passage is made of iron or steel material apt to rust, there is the possibility that the passage is stopped up by the rust, therefore complications on use such as rust prevention, administration of the cooling liquid, periodical maintenance are accompanied.

Further, when the magnetic particle type electromagnetic clutch is combined with a gear device to constitute a power transmission apparatus and the gear device is also necessitated to be cooled, another cooling apparatus for the gear device has to be provided, that is uneconomical in view of space and cost.

SUMMARY OF THE INVENTION

The present invention has been accomplished in view of the foregoing and an object of the invention is to provide a cooling structure of a power transmission apparatus in which the construction is simple and easily worked, it is easy to provide fins for improving cooling effect, there is no complication on use and both a clutch side and a gear device side can be cooled concurrently.

In order to attain the above object, the present invention provides a cooling structure of a power transmission apparatus having an electromagnetic clutch including a fixed outer member with an exciting coil and a rotary inner member adapted to be fixed to the outer member by controlling electric energy provided to the exciting coil, and a gear device connected to the inner member, comprising a cooling apparatus positioned between the outer member and a gear case member housing the gear device.

According to the present invention, since the cooling apparatus is provided utilizing a dead space between the fixed outer member of the electromagnetic clutch and the gear case member, it can be avoided that the power transmission apparatus becomes large owing to the cooling apparatus. Since the cooling apparatus is provided outside of the outer member, the construction can be simplified, the working is easy, the cooling medium can be sealed simply and surely, and the maintenance is also easy without accompanying complications on use.

Both slipping portion between the outer and inner members and the exciting coil, which are the heat sources, can be cooled by the cooling apparatus with a high cooling efficiency. In addition, the cooling apparatus concurrently cools the gear device side too, so that another cooling apparatus is unnecessary.

The above-mentioned gear device may be a planetary gear device having a first gear element connected to an input member for inputting a rotational driving force, a second gear element connected to an output member and a third gear element connected to the inner member of the electromagnetic clutch. According to this configuration, a power transmission apparatus with a variable-speed mechanism can be constituted easily.

The above-mentioned cooling apparatus may have a passage for cooling medium formed by fins projected from the outer member toward the gear case member. According to this configuration, a large heat transmitting area is ensured within a narrow space to improve the cooling effect and therefore it is unnecessary to let a large quantity of cooling medium flow. Since the fins are formed outside of the outer member, the work is easy.

The above-mentioned passage for cooling medium may have an outlet port at an uppermost portion of the passage and an inlet port at a portion lower than the outlet port. In this configuration, air within the cooling apparatus is discharged from the outlet port at the uppermost position and never stay in the cooling medium passage so that an efficient cooling can be maintained.

A second passage for cooling medium constituting a heat exchange portion to an interior of the gear case member may be formed between the outer member and the gear case member in addition to the above-mentioned first passage for cooling medium. According to this configuration, both the electromagnetic clutch and the gear device can be cooled efficiently by only one cooling apparatus.

The first and second passages may be connected with each other positioning the second passage at an upper stream side of flow of the cooling medium and the first passage at a lower stream side of flow of the cooling medium. In this configuration, the cooling medium flows firstly through the second passage constituting the heat exchange portion to the interior of the gear case member in which heat generation and temperature are lower than those in the electromagnetic clutch, and then flows through the first passage of higher temperature, so that an efficient cooling can be obtained.

A lubricating oil introducing port may be provided at the heat exchange portion. Since the lubricating oil is cooled at the heat exchange portion by the cooling medium then supplied to the gear device, the gear device is cooled very effectively.

DETAILED DESCRIPTION OF THE PREFERRED EMBODIMENT

Figure 1:
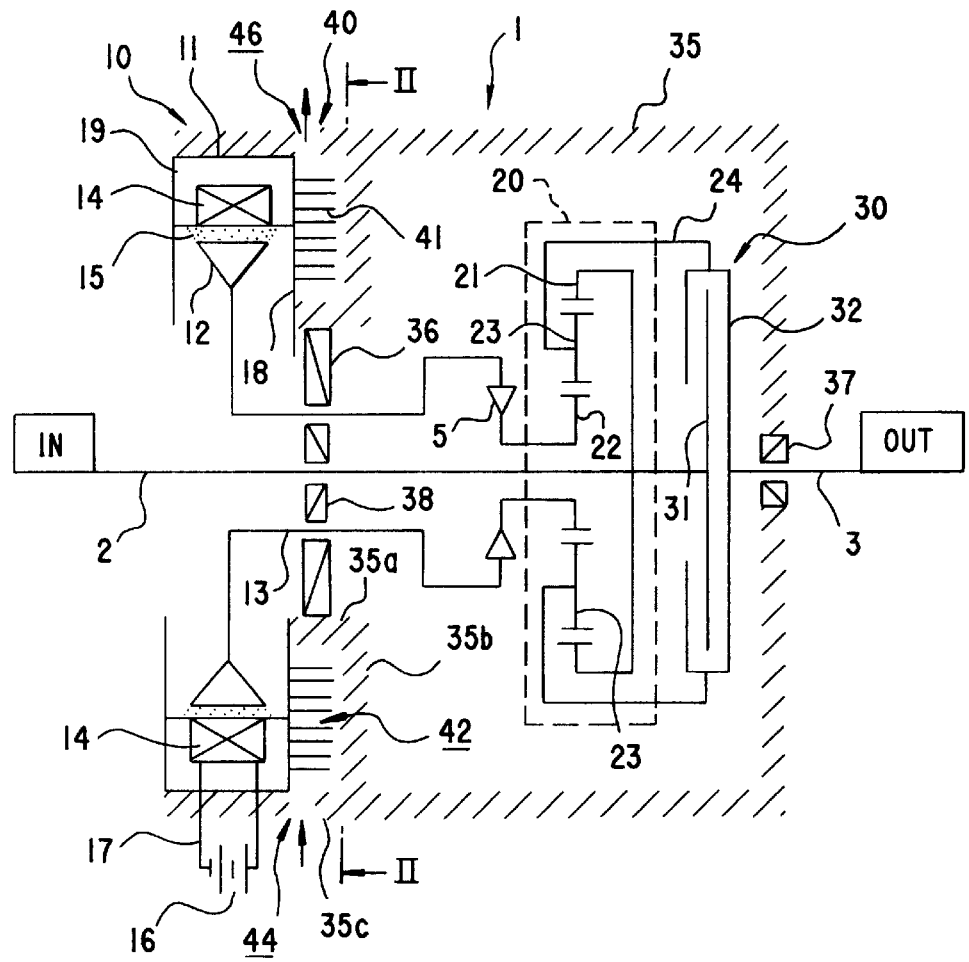
FIG. 1 is a rough constitutional view of a variable-speed apparatus according to a preferred embodiment of the present invention.

Hereinafter, an embodiment of the present invention will be described with reference to FIGS. 1 to 3. This embodiment is a two-stage variable-speed apparatus 1 of which a rough constitutional view is shown in FIG. 1. The two-stage variable-speed apparatus 1 is constituted by combining a magnetic particle type electromagnetic clutch 10, a planetary gear device 20 and a hydraulic clutch 30, on the whole, and a cooling apparatus 40 is provided between the electromagnetic clutch 10 and the planetary gear device 20.

The magnetic particle type electromagnetic clutch 10 comprises a fixed stationary outer member 11 and an inner member 12 arranged rotationally inside of the outer member fitted to a rotary cylindrical member 13. An exciting coil 14 wound in a circumferential direction is housed in a circumferential wall 18 of the outer member 11 and electromagnetic powder 15 is interposed between the outer member 11 and the inner member 12. The exciting coil 14 on the stationary side is supplied with electric power from an electric source 16 through electric lines 17.

The planetary gear device 20 and the hydraulic clutch 30 are accommodated in a gear case member 35. The planetary gear device 20 has a ring gear 21 integrally connected to an input shaft 2 as well as a rotary member 31 of the hydraulic clutch 30, a sun gear 22 connected to the rotary cylindrical member 13 of the electromagnetic clutch 10 through an one-way clutch 5, and a planetary gear 23 connected to another rotary member 32 of the hydraulic clutch 30 through a carrier 24. The rotary member 32 is integrally connected to an output shaft 3.

Between the gear case member 35 covering the planetary gear device 20 and the hydraulic clutch 30 and the rotary cylindrical member 13 projecting from the gear case member is interposed a seal member 36, between the gear case member 35 and the output shaft 3 is interposed a seal member 37 and also between the input shaft 2 and the rotary cylindrical member 13 is interposed a seal member 38. These seal members prevent lubricating oil in the gear case member 35 from leaking out.

When both of the magnetic particle type electromagnetic clutch 10 and the hydraulic clutch 30 are in clutch-out states, the inner member 12 of the electromagnetic clutch 10 can rotate freely and the sun gear 22 connected to the inner member 12 also can rotate freely. Rotation of the ring gear 21 caused by rotational power of the input shaft 2 is transmitted to the freely rotatable sun gear 22 through the planetary gear 23 with no load, and the sun gear 22 runs idle in reverse together with the rotary cylindrical member 13 connected to it through the one-way clutch 5.

Since the planetary gear 23 rotates on its axis but does not revolve round the sun gear, no power is transmitted to the carrier 24, the rotary member 32 of the hydraulic clutch 30 and the output shaft 3, therefore the apparatus is in a neutral state.

At this time, if the exciting coil 14 of the electromagnetic clutch 10 is electrified, a magnetic field takes place and the magnetic particles of the electromagnetic powder 15 are magnetized to form a linkage for connecting the inner member 12 with the stationary outer member 11. As the result, the inner member 12 is fixed together with the rotary cylindrical member 13 to prohibit the reverse rotation of the sun gear 22 through the one-way clutch 5. And between the sun gear prohibited from the reverse rotation and the ring gear 21 rotated by the rotational power of the input shaft 2, the planetary gear 23 revolves round the sun gear 22 while rotating on its own axis to rotate the carrier 24, the rotary member 32 of the hydraulic clutch 30 and the output shaft 3 at a low speed.

Hereupon, if also the hydraulic clutch 30 is let in, the ring gear 21 and the carrier 24 are integrally connected and the whole planetary gear device 20 can rotate as one body, because the normal rotation of the sun gear is not prohibited by the one-way clutch 5. Namely, the input shaft 2 is directly connected to the output shaft 3 for rotating the output shaft 3 at a high speed.

As mentioned above, according to the variable-speed apparatus 1, two stages of variable-speed states, high and low, can be obtained besides the neutral state. Shifting from the neutral state to the low or high speed rotation state can be carried out quickly and smoothly using the magnetic particle type electromagnetic clutch 10.

Now, the cooling apparatus provided in the annular space between the gear case member 35 and the circumferential wall 18 of the magnetic particle type electromagnetic clutch 10 will be described. FIG. 3 shows a more concrete construction of a part of the electromagnetic clutch 10 and the gear case member 35 relating to the cooling apparatus 40.

The input shaft 2 is rotationally supported by a bearing 6 within the rotary cylindrical member 13. The member 13 is rotationally supported by a bearing 7 within a cylindrical opening 35a at the input side of the gear case member 35 and extruded outside. A radially extending disk-like flange 13a is formed at the extruded outer end of the rotary cylindrical member 13. An inner circumferential portion of the annular inner member 12 is fixed to the flange 13a.

The inner member made of iron material has an outer circumferential enlarged portion 12a surrounded by the annular circumferential wall 18 of the outer member 11. The wall 18 is made of aluminum which is nonferrous material having a good thermal conductivity and formed in a U-shaped section by an outer wall portion 18a, an outer peripheral wall portion 18b and an inner wall portion 18c. The wall portions 18b and 18c are formed in one body. The wall portions 18a, 18b, 18c cover an annular interior space and at a radially outer portion in the annular interior space is provided the exciting coil 14 supported by a field core 19 made of iron.

The enlarged portion 12a of the inner member 12 is positioned in the space at an inner circumference side of the exciting coil 14. At an inner circumference side of the enlarged portion 12a, on surfaces of the both sides of the inner member and each inner surface of the outer wall portion 18a and the inner wall portion 18c are fixed tapering ring-shaped obstruction plates 8 being opened toward radially outward direction to prevent the magnetic particles from falling toward radially inner side and let them remain in the neighborhood of the exciting coil 14 always. Thus, biasing of the electromagnetic powder 15 can be prevented and a smooth operation of the clutch is obtainable.

At a radially outer circumference on an outer face of the inner wall portion 18c of the outer member 11 are formed and projected a plurality of arcuate cooling fins 41 coaxially. Each cooling fin 41 has inner and outer circumferential surfaces slightly inclined to each other so as to be tapered and a slope θ for mold drawing is formed.

A side wall 35b of the gear case member 35 facing the electromagnetic clutch 10 and having the cylindrical opening portion 35a has a cylindrical portion 35c projecting at the radially outer circumference thereof. The inner diameter of the cylindrical portion 35c is equal to the outer diameter of the outer peripheral wall portion 18b of the circumferential wall 18 of the outer member 11 and in the cylindrical portion 35c is fixedly fitted the outer member 11 with intermediation of O-ring 39. A space between the inner wall portion 18c of the outer member 11 and the side wall 35b of the gear case member 35 forms a cooling water passage 42 through which cooling water of the cooling apparatus 40 flows.

The cooling fins 41 provided at the radially outer circumference in the passage 42 have tip ends close to the side wall 35b of the gear case member 35 with some clearance C. Cooling water passages 42a are formed between adjacent cooling fins 41.

Figure 2:
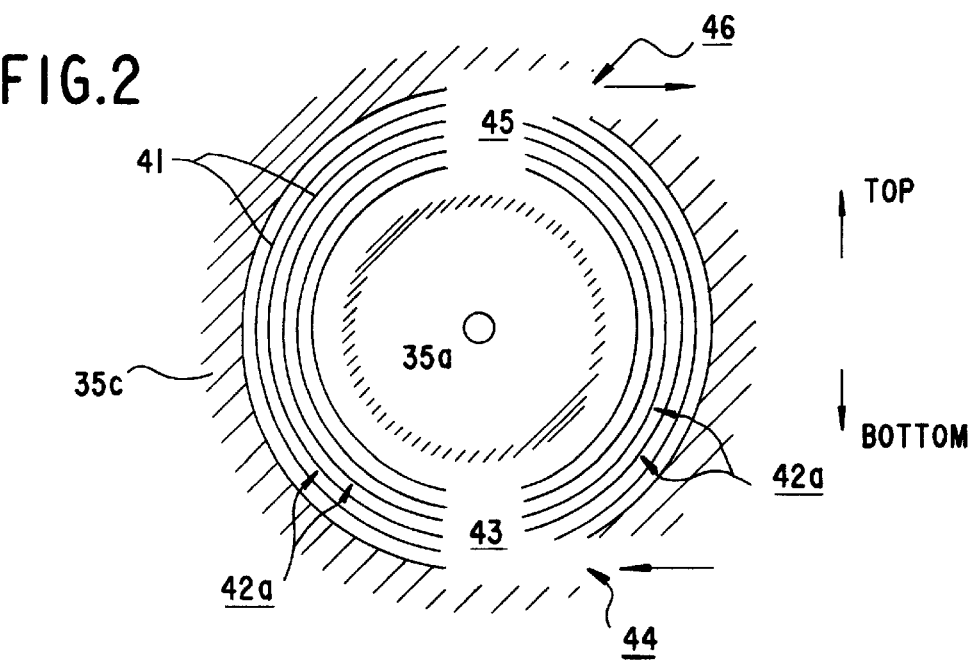
FIG. 2 is a sectional view along the line II—II of FIG. 1.
Figure 3:
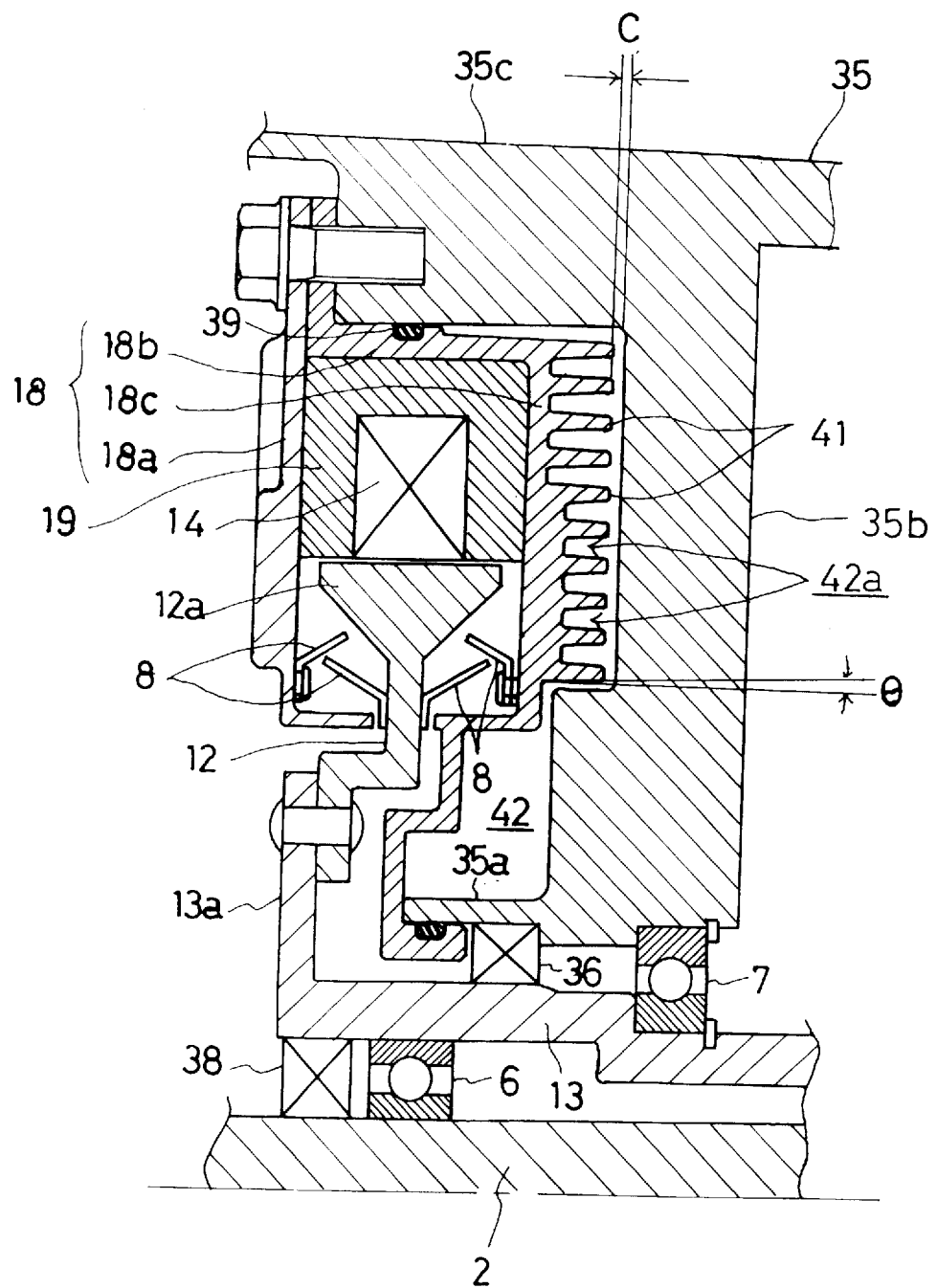
FIG. 3 is a sectional view showing a concrete construction of an essential part of the variable-speed apparatus.

As shown in FIG. 2, the cooling fins 41 are shaped in semicircular arcs and arranged separated in right and left at appropriate intervals. A cooling water inlet port 44 is provided at a lower separation space 43 and a cooling water outlet port 46 is provided at an upper separation space 45.

In the cooling apparatus 40 formed between the electromagnetic clutch 10 and the gear case member 35, cooling water is introduced into the lower separation space 43 through the cooling water inlet port 44, branches off into right and left from the space 43 and flows upward through the cooling water passages 42a formed by the arcuate cooling fins 41. The right and left flows join at the upper separation space 45 to be discharged through the cooling water outlet port 46 at the uppermost position of the cooling water passage 42.

As described above, the cooling apparatus 40 is provided utilizing a dead space between the outer member 11 of the magnetic particle type electromagnetic clutch 10 and the gear case member 35 of the planetary gear device 20, so that the variable-speed apparatus 1 does not become large owing to the cooling apparatus 40. In addition, since the cooling apparatus 40 is capable of cooling the planetary gear device side too, another apparatus for cooling the planetary gear device 20 is unnecessary.

The cooling apparatus 40 is provided outside of the outer member 11 instead of being provided within the outer member 11 or the inner member 12, so that the construction of the magnetic particle type electromagnetic clutch 10 itself can be simplified and working and manufacturing of the clutch is easy.

Since the cooling fins 41 are formed on the outer side of the inner wall portion 18c of the circumferential wall 18 of the outer member 11 and have the slopes θ, mold drawing is easy. Further, the circumferential wall 18 is made of aluminum having plasticity, so that the outer member can be worked very easily and produced in large quantities cheaply.

The inner wall portion 18c and the cooling fins made of aluminum are corrosion-resistant and rustless, so that there is no possibility that the cooling water passage is stooped up by the rust to lower cooling effect and complications on use such as rust prevention, administration of the cooling liquid and periodical maintenance are not accompanied.

The electromagnetic powder 15 and the exciting coil 14 housed within the circumferential wall 18 of the outer member 11 are apt to be influenced by liquid, but since the cooling water flows outside of the circumferential wall 18, a reliable seal is ensured without adopting a special construction for sealing. Therefore, an improvement of performance reliability can be expected.

The cooling water passage 42 of the cooling apparatus 40 extends over nearly whole surface of a side of the outer member 11 and the cooling fins 41 are provided on the circumferential wall 18 covering heat sources such as the exciting coil 14 and the sliding portion between the outer and inner members 11, 12, so that the heat sources are cooled efficiently.

The circumferential wall 18 with the cooling fins 41 formed integrally is made of aluminum having a good heat conductivity and the iron core 19 supporting the exciting coil 14 is wrapped in the circumferential wall 18 for effective cooling of the exciting coil 14.

Cooling water introduced from the lower inlet port 44 flows upward through the passage 42a formed by the cooling fins 41 and discharges out of the outlet port 46 positioned at an uppermost portion of the cooling water passage 42. There is some clearance formed between the cooling fin 41 projecting from the circumferential wall 18 and the side wall 35b of the gear case member 35. Therefore, air within the cooling water passage 42 is discharged without remaining in the passage to obstruct the cooling. Needless to say, as for the cooling medium, it is better to use liquid such as water which has far superior heat transfer rate compared with gas.

Figure 4:
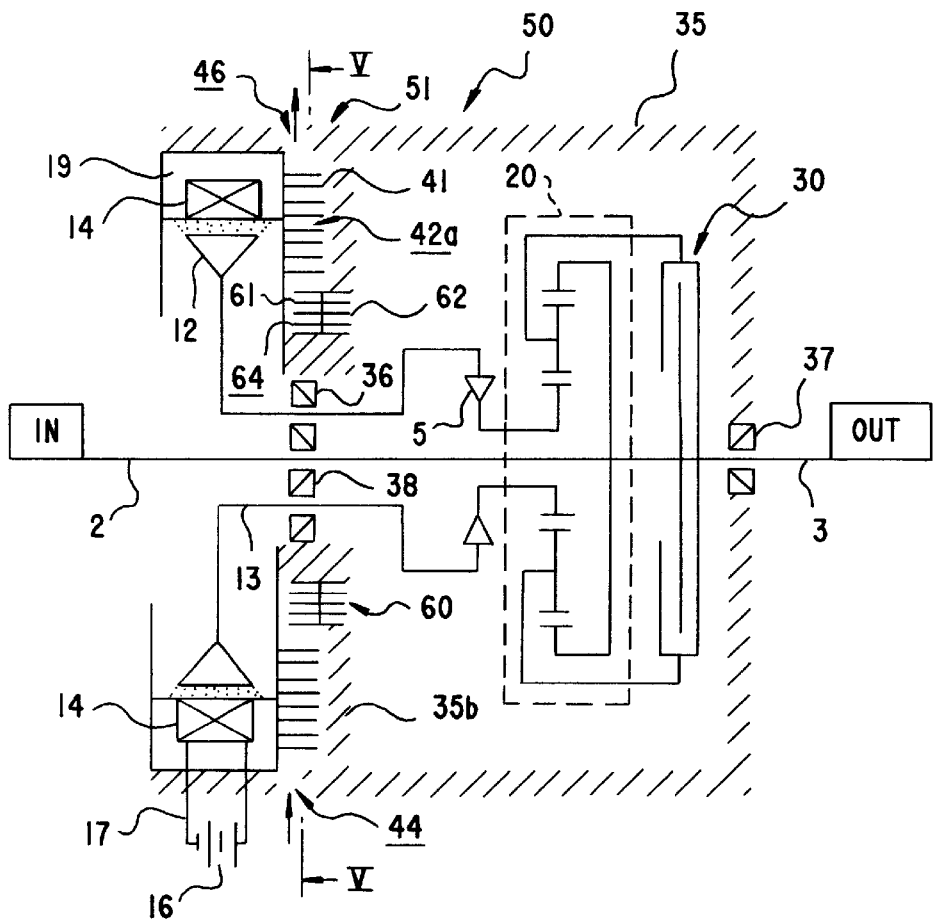
FIG. 4 is a rough constitutional view of a variable-speed apparatus according to another embodiment of the present invention.
Figure 5:
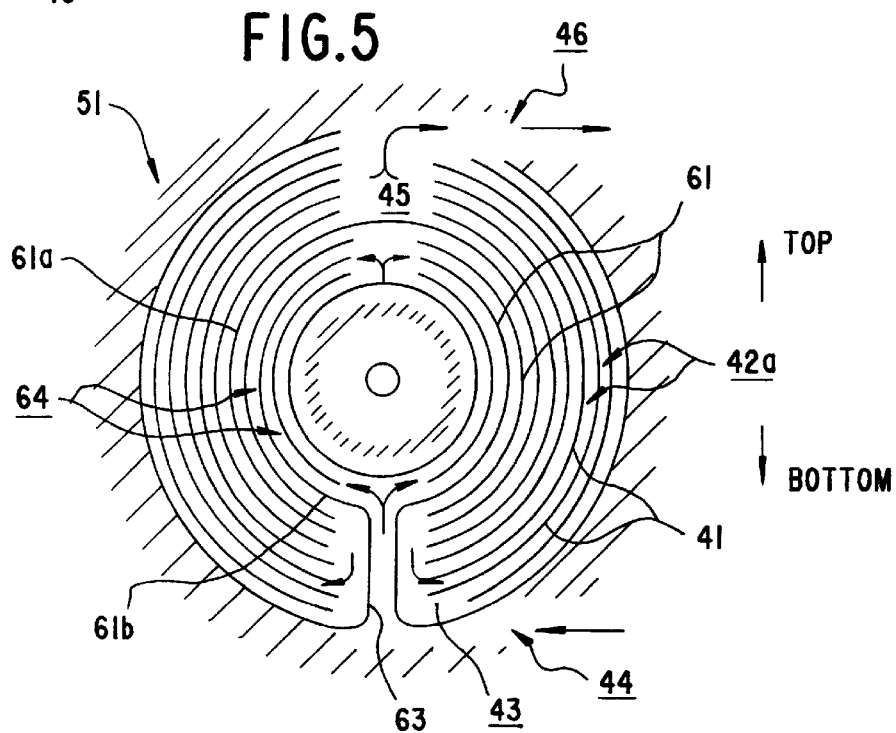
FIG. 5 is a sectional view along the line V—V of FIG. 4.
Figure 6:
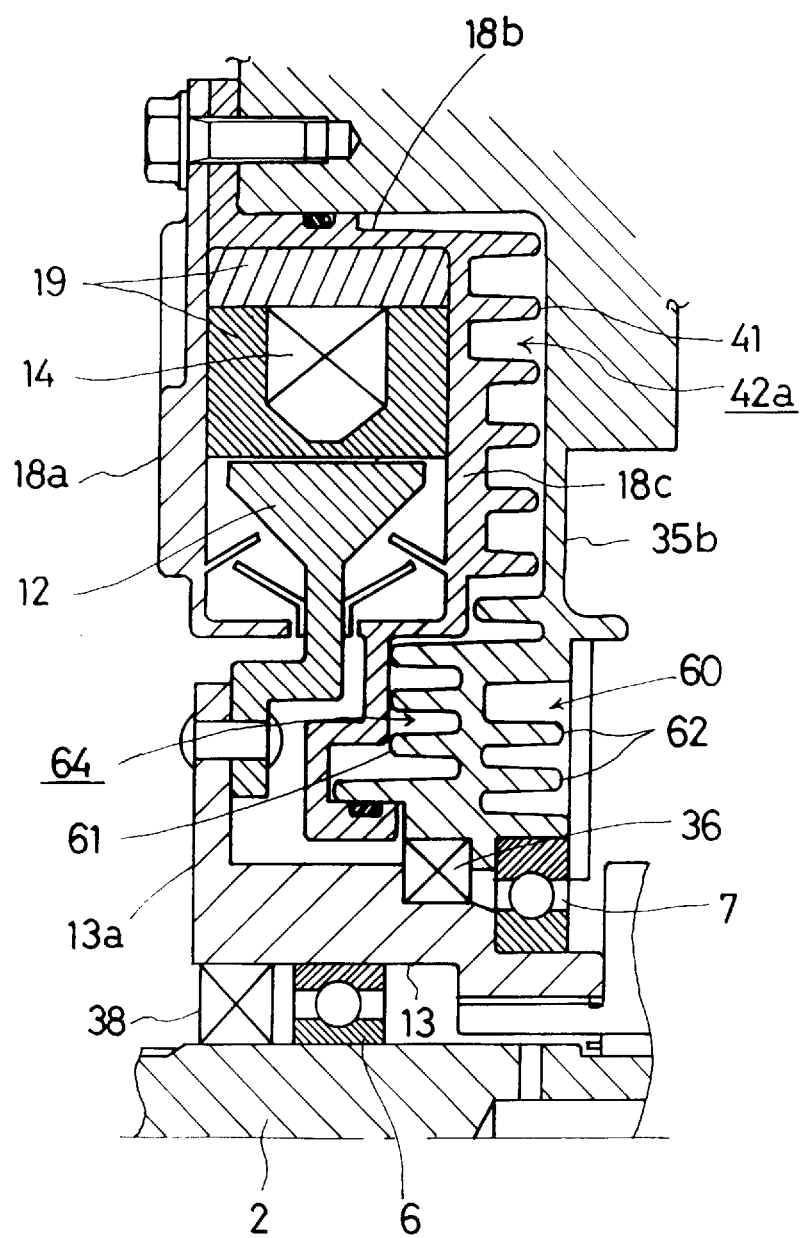
FIG. 6 is a sectional view showing a concrete construction of an essential part of the variable-speed apparatus.

FIGS. 4 to 6 show another embodiment of the present invention. The variable-speed apparatus 50 according to this embodiment has the same construction as the above-mentioned variable-speed apparatus 1 excepting that a heat exchange portion 60 to an interior of the gear case member is provided in the cooling apparatus 51. Therefore, in FIGS.

4 to 6, parts similar to those of the above-mentioned embodiment are denoted by the same reference numerals.

As shown in FIG. 6, at a central part of the side wall 35*b* of the gear case member 35 are provided a heat exchange portion 60 having arcuate cooling fins 61, 62 formed on the both surfaces. The fins 61 project into the cooling water passage 42 of the cooling apparatus while the fins 62 project into an interior of the gear case member 35.

The cooling fins 61 comprises a cooling fin 61*a* of maximum diameter having a circular shape opened at a lower part only and the other fins 61 having semicircular shape arranged right and left separately. These cooling fins 61 form a second cooling water passage 64 communicating with the aforementioned first cooling water passage 42*a* formed by the cooling fins 41. Among the cooling fins 61, fins 61*b* of an intermediate diameter are connected with a connecting passage 63 extending radially downward. The connecting passage 63 passes through the lower separation space 43 of the cooling fins 41 to communicate with the cooling water inlet port 44.

As shown in FIG. 5, the cooling water introduced from the cooling water inlet port 44 provided at the lower side of the cooling apparatus 51 passes through the connecting passage 63 toward the center side, enters radially inner portion of the cooling water passage 64 of the heat exchange portion 60, separates right and left to flow upward and again joins together at the upper space. Then, the cooling water flows down through right and left radially outer portions of the cooling water passage 64 to the lower separation space 43, enters right and left cooling water passage 42*a*, joins together at the upper separation space 45 and discharges from the cooling water outlet port 46 at the uppermost position of the cooling water passage.

As described above, in the cooling apparatus 51, the second cooling water passage 64 for cooling the gear case member 35 side is arranged at the upper stream side of flow of the cooling water and the first cooling water passage 42*a* for cooling the magnetic particle type electromagnetic clutch 10 side is arranged at the lower stream side of flow of the cooling water so that the cooling water flows from the gear case member 35 side to the electromagnetic clutch 10 side.

As the heat exchange portion 60 is provided, the planetary gear device 20 is cooled efficiently concurrently with cooling of the electromagnetic clutch 10. In addition, since the cooling water firstly flows through the second cooling water passage 64 on the side of the planetary gear device 20 in which heat generation is smaller and temperature is lower compared with the electromagnetic clutch, then flows through the first cooling water passage 42*a* in which temperature is higher, more efficiently cooling can be carried out.

Figure 7:
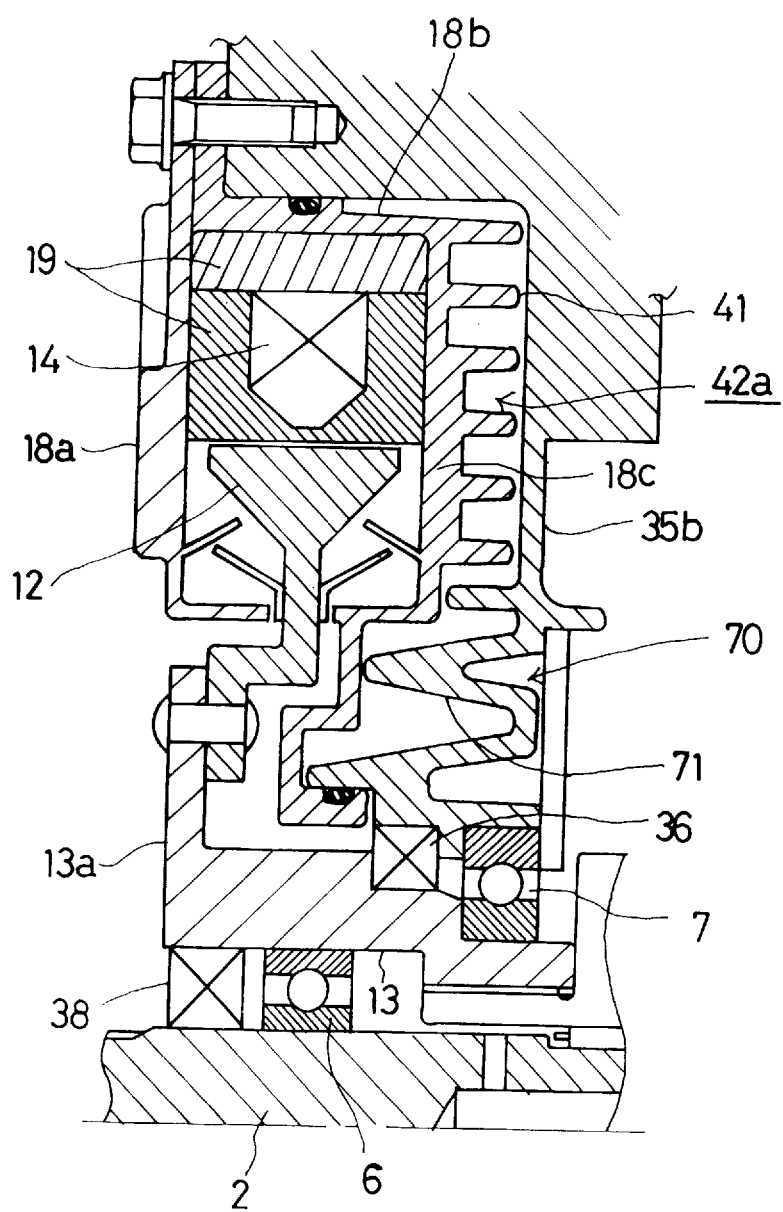
FIG. 7 is a sectional view similar to FIG. 6 showing a modification.

Another heat exchange portion 70 shown in FIG. 7 is formed by transforming its side wall 71 into a wave-like sectional shape in place of providing the above-mentioned cooling fins 61, 62. There is no substantial difference in heat exchange effect between the heat exchange portions 51, 71, but the heat exchange portion 71 can be worked more easily.

Figure 8:
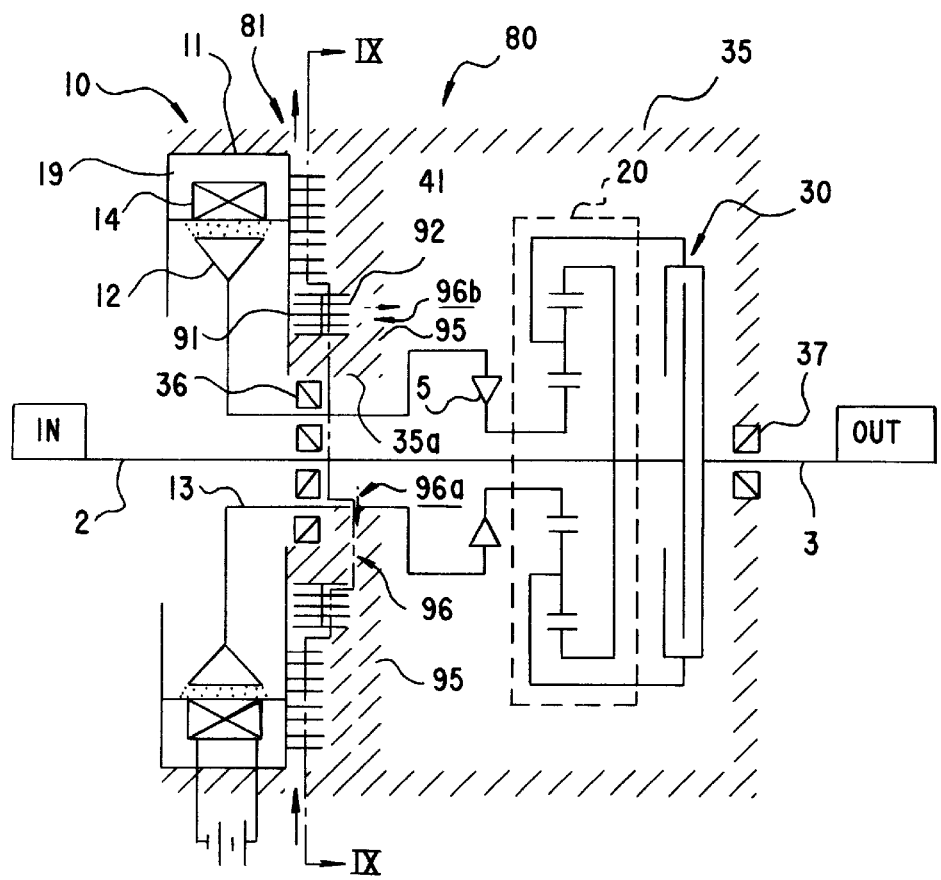
FIG. 8 is a rough constitutional view of a variable-speed apparatus according to the other embodiment.
Figure 9:
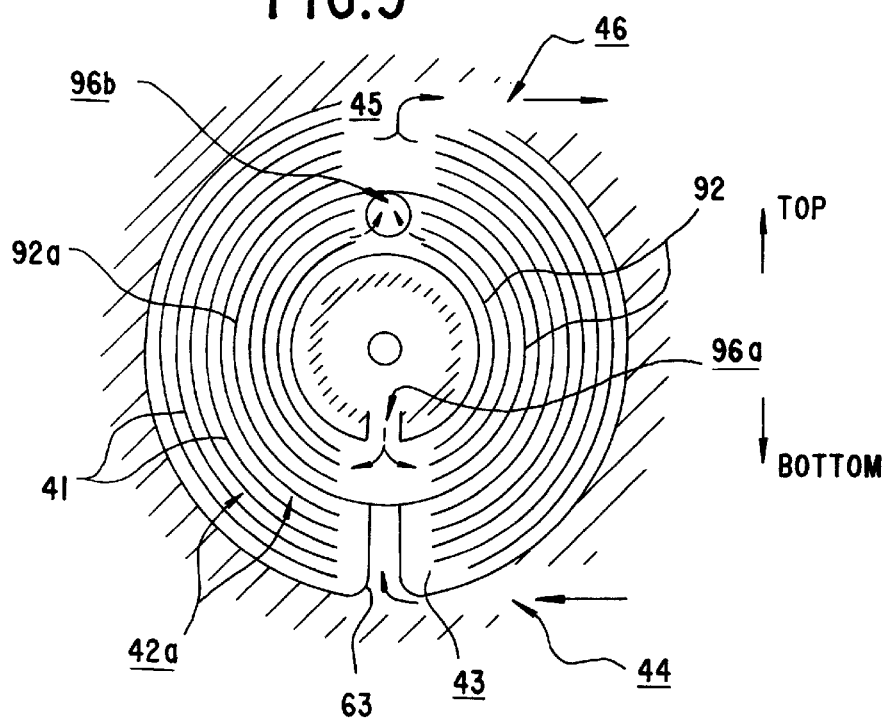
FIG. 9 is a sectional view along the line IX—IX of FIG. 8.

FIGS. 8 and 9 show the other embodiment. The variable-speed apparatus 80 of this embodiment has the same construction as the above-mentioned variable-speed apparatus 1, 50 and the cooling apparatus 81 is provided with a heat exchange portion 90 to the interior of the gear case member similarly to the above-mentioned cooling apparatus 51, however the heat exchange portion 90 has a lubricating oil introducing passage 96. Therefore, in FIGS. 8 and 9, parts similar to those of the above-mentioned embodiments are denoted by the same reference numerals.

The heat exchange portion 90 has arcuate cooling fins 91, 92 on both sides similarly to the aforementioned heat exchange portion 60, and the cooling water passage formed by the cooling fins 91 projecting into the cooling apparatus 81 and the cooling fins 41 of the electromagnetic clutch 10 side has the same construction as that of FIG. 5.

The cooling fins 92 on the side of the planetary gear device 20 are semicircular and arranged apart right and left within an outermost circumferential wall 92*a* which is perfectly circular. These fins 92 are separated from interior of the gear case by a partition wall 95 and form a lubricating oil introducing passage 96.

Lubricating oil is introduced into the lubricating oil introducing passage 96 from an introducing port 96*a* provided on a lower side of the central cylindrical opening portion 35*a* of the gear case member 35, and discharged from a discharging port 96*b* provided in the partition wall 95 at a position corresponding to an outer circumferential and upper portion of the cooling fins 92 to be supplied into the gear case.

Since the lubricating oil is cooled just before it is supplied into the gear case, the planetary gear device 20 can be cooled efficiently.

In the above-mentioned embodiments, the present invention is applied to the power transmission apparatus using the magnetic particle type electromagnetic clutch, however, the cooling structure of the present invention is also applicable to an electromagnetic clutch of hysteresis type or friction plate type, a mechanical type clutch using a friction plate or a oil-air type clutch.

In the cooling apparatuses 40, 51, 70, the cooling fins 41 project from the side of the electromagnetic clutch 10, but cooling fins projecting from the side of the gear case member 35 may be formed additionally. Further, in the heat exchange portions 60, 90, additional cooling fins facing to the cooling fins 61, 91 may be projected from the side of the circumferential wall 18 of the electromagnetic clutch 19.

What is claimed is:

1. A cooling structure of a gear transmission having an electromagnetic clutch including a fixed outer member with an exciting coil and a rotary inner member adapted to be fixed to said outer member by controlling electric energy provided to said exciting coil and a gear device connected to said inner member, wherein:

a cooling apparatus positioned between said outer member and a gear case member housing said gear device, said cooling apparatus comprising:

a first passage for a cooling medium, said first passage formed by fins projected from said outer member toward said gear case member; and a second passage for the cooling medium constituting a heat exchange portion to an interior of said gear case member, said second passage formed in addition to said first passage for the cooling medium, said second passage being formed between said outer member and a side wall which is a part of said gear case member, said side wall having fins projected into said second passage and having fins projected into said interior of said gear case member.

2. A cooling structure of a gear transmission claimed in claim 1, wherein said second passage is provided at a central part of said cooling apparatus and said fins projected into said second passage comprise fins of semicircular shape arranged right and left separately and a fin of maximum diameter having a circular shape opened at a lower part only.

3. A cooling structure of a gear transmission claimed in claim 1, wherein said side wall is formed in a wave-like sectional shape for providing said fins.

4. A cooling structure of a gear transmission having an electromagnetic clutch including a fixed outer member with an exciting coil and a rotary inner member adapted to be fixed to said outer member by controlling electric energy provided to said exciting coil and a gear device connected to said inner member, wherein
- a cooling apparatus positioned between said outer member and a gear case member housing said gear device, said cooling apparatus comprising:
- a first passage for a cooling medium, said first passage formed by fins projected from said outer member toward said gear case member;
- a second passage for the cooling medium constituting a heat exchange portion to an interior of said gear case member, said second passage formed between said outer member and said gear case member in addition to said first passage for the cooling medium; and
- a lubricating oil introducing port formed in said gear case member at said heat exchange portion to introduce a lubricating oil of said gear device into said heat exchange portion for heat exchange between said cooling medium and said lubricating oil.

5. A cooling structure of a gear transmission claimed in claim 4, wherein said gear device is a planetary gear device having a first gear element connected to an input member for inputting a rotational driving force, a second gear element connected to an output member and a third gear element connected to said inner member of the electromagnetic clutch.

6. A cooling structure of a gear transmission claimed in claim 4, wherein said first passage for cooling medium has an outlet port at an uppermost portion of said first passage and an inlet port at a portion lower than said outlet port.

7. A cooling structure of a gear transmission claimed in claim 4, wherein said first and second passages are connected with each other, said second passage is positioned at an upper stream side of flow of said cooling medium, and said first passage is positioned at a lower stream side of flow of said cooling medium.

* * * * *